United States Patent [19]
Frus et al.

[11] Patent Number: 6,081,074
[45] Date of Patent: Jun. 27, 2000

[54] METHOD AND APPARATUS FOR OFFSETTING POWER DRAW IN A MULTIPLE CHANNEL SYSTEM

[75] Inventors: John R. Frus; Michael J. Cochran, both of Jacksonville, Fla.

[73] Assignee: Unison Industries, Inc., Jacksonville, Fla.

[21] Appl. No.: 08/706,073

[22] Filed: Aug. 30, 1996

[51] Int. Cl.[7] .................................................. H05B 37/02
[52] U.S. Cl. .............................. 315/209 CD; 315/209 T; 315/209 SC; 60/39.06; 60/39.141; 123/634
[58] Field of Search .................................. 123/634, 596, 123/605; 60/39.06, 39.141; 315/209 CD, 209 T, 209 R, 209 SC

[56] References Cited

U.S. PATENT DOCUMENTS

| 3,240,198 | 3/1966 | London et al. ........................ 123/634 |
| 5,065,073 | 11/1991 | Frus . | |

*Primary Examiner*—Michael B. Shingleton
*Attorney, Agent, or Firm*—Leydig, Voit & Mayer, Ltd.

[57] ABSTRACT

An apparatus and method are disclosed for reducing peaks of operating power drawn from a power source by a multi-channel system. Each channel of the system drives a load and demands operating power from the power source in an intermittent manner. Power is supplied to the multi-channel system from the power source. Operating power from the power source is drawn in an intermittent manner into each of two or more channels of the multi-channel system. The drawing of the operating power is by the two or more channels so that occurrences of peak operating power launched in a first channel do not fully overlap the occurrences of peak operating power in a second channel.

28 Claims, 6 Drawing Sheets

Fig. 1

Fig. 2 CONVENTIONAL DUAL CHANNEL EXCITER

Fig. 3 WITH DELAYED START FOR STAGGERED OPERATION

METHOD AND APPARATUS FOR OFFSETTING POWER DRAW IN A MULTIPLE CHANNEL SYSTEM

FIELD OF THE INVENTION

This invention relates generally to improvements in multiple channel intermittent systems, and more particularly to a method and apparatus for controlling the total input power and input current demands of power circuitry having multiple channels that derive their power from the same source.

BACKGROUND OF THE INVENTION

Solid-state ignition systems are known in the art. U.S. Pat. No. 5,065,073 (hereinafter "the '073 patent"), which is hereby incorporated by reference, teaches that improved control over the performance of an ignition system can be achieved by incorporating a solid-state switch into an ignition output circuit. As taught by the '073 patent, the ability of a solid-state switch to be triggered at a precise time allows an ignition system incorporating such a switch to achieve controlled spark rates. As explained in the '073 patent, the control of the spark rate may be accomplished by inserting a time delay into the sequence of events generating successive sparks. The sequence is: charge an energy storage device which is most generally a capacitor, rapidly discharge that energy through a switch to a sparking device, wait for a predetermined period of time before again charging the energy storage device for the next spark. These three events have relatively different times associated with them. Generally, the charge cycle is accomplished in a few tens of milliseconds, whereas the discharge event is instantaneous in comparison, lasting only a few hundred microseconds, and the waiting time is several times longer than the charge time. This sequence is characterized by a large ratio of peak power versus average power demanded from the input. The power demand, and consequently the input current, is relatively higher during the charge cycle and lower, nearly none, during the waiting time between charge cycles.

It is common in the art of ignition systems to design an apparatus with multiple redundant channels to increase the reliability of ignition. When such multi-channel apparatus is designed according to the teachings of the above referenced patent, the power demand ratio is further accentuated. For example, in a dual channel system, immediately following application of input power both channels demand current for their charge cycles at the same time. Aside from minor imbalances in the channels, the charge cycles are of similar duration, the channels discharge at approximately the same time, and they both wait during the same period of time before resuming their respective charge cycles. These overlapping charge cycles effectively double both the magnitude of the total peak demand and the peak-to-average power demand ratio.

The '073 patent also teaches that increasing the repetition rate for a period of time following application of input power provides a burst of sparks synchronized with engine start-up. The power demanded during the burst period is several times higher than that required after the burst period terminates. In an ignition system with multiple channels, especially if it includes a burst-of-sparks feature, there is a further increased demand on the power source for the ignition apparatus. The surge of power and current immediately following application of power may be in excess of practical limitations imposed by the wiring, overcurrent protection devices, and the capacity of the power source.

SUMMARY OF THE INVENTION

It is a general object of the invention to provide a reduction in the peak power demanded by a multi-channel intermittent system to lessen the demands on a common power source.

It is another object of the invention to provide improved ignition by providing a decrease in the period between successive spark events occurring in a combustion chamber common to the multiple sparking devices fed by the multi-channel ignition system. It is a related object of the invention to achieve the foregoing without increasing the repetition rate of any individual channel of the multi-channel system.

It is another object of the invention to achieve the foregoing objectives without compromising redundancy.

The present invention accomplishes the foregoing and other objectives by providing an apparatus which offsets the initiation of the first charge cycle of each of the at least two channels by providing a delayed-start circuit in at least one of the channels. The delayed-start circuit delays that channel's charge cycle for a sufficient time to allow the other channel to complete its charge cycle.

In accordance with another aspect of the invention, each of the channels of the system has a delayed-start circuit preset for a delay different from the circuits of the other channels, such that the delay time of each channel results in no time overlapping of the charge cycles of the different channels.

In accordance with yet another aspect of the invention, the time differential between delayed-start times is set such that the charge cycles of the channels are equally spaced in time and in a predetermined sequence of channels.

In another aspect of the invention a failsafe interconnection is provided between the channels such that one channel monitors another to maintain out-of-phase synchronization, but in the event of failure of a channel, the remaining channel(s) continue to operate in the normal sequence and timing.

BRIEF DESCRIPTION OF THE DRAWINGS

The above and other features and advantages of the invention will be more readily apparent upon reading the following description of the preferred embodiment of the invention and upon reference to the accompanying drawings wherein.

DESCRIPTION OF THE PREFERRED EMBODIMENTS

Figure 1:
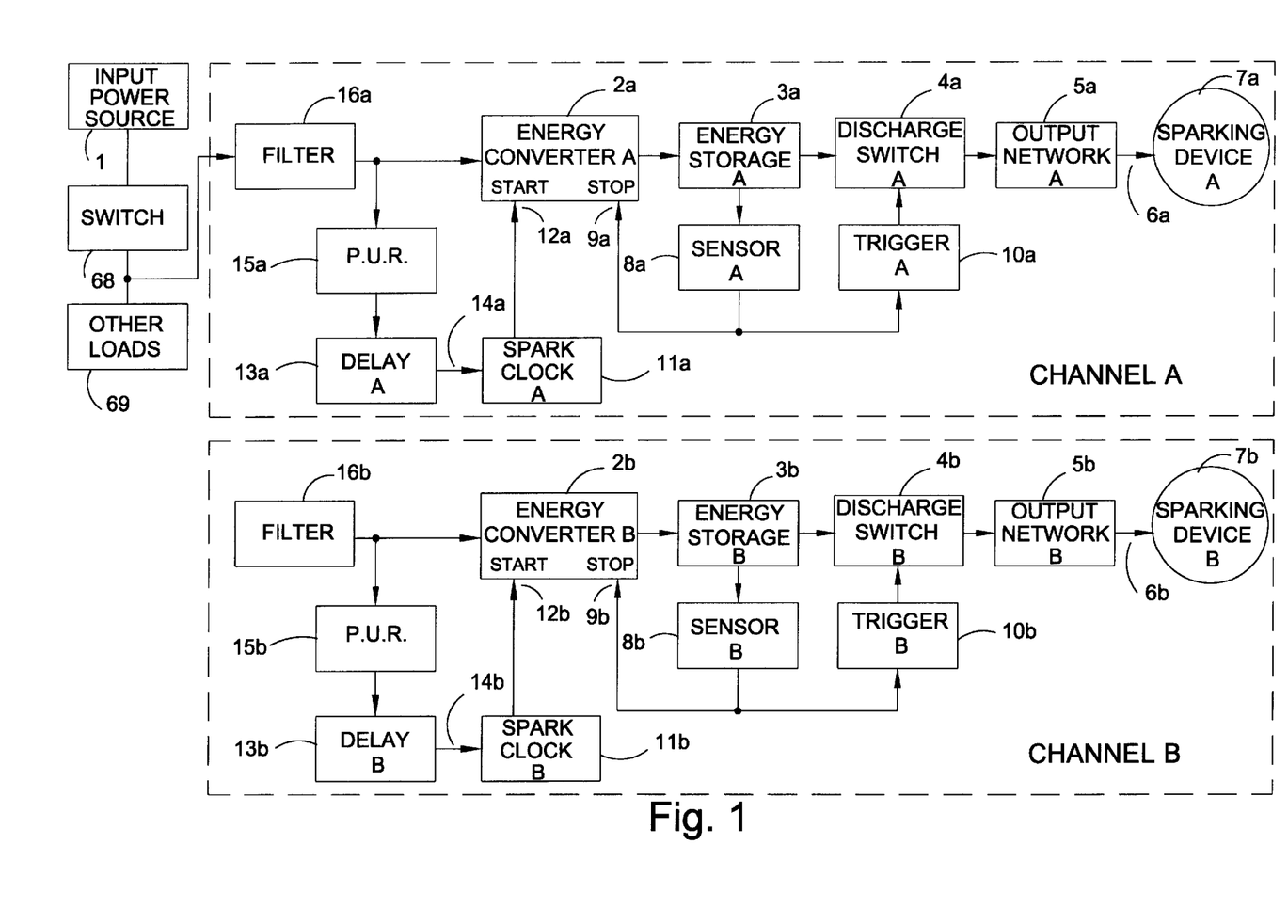
FIG. 1 is a block diagram of a dual channel ignition apparatus( i.e., channels A and B ) including delayed-start circuitry to offset the cyclical functions of the two channels in accordance with the teachings of the instant invention.

Turning to the drawings and referring first to FIG. 1, a dual channel ignition exciter constructed in accordance with the teachings of the instant invention is illustrated in block diagram form. Most of the functional blocks in the diagram are typical of those found in conventional ignition exciters and, therefore, the following description does not detail the functions of these blocks since they are well understood in the art. Although the illustrations are of ignition circuits, it will become apparent to one skilled in the art that the invention is applicable to other applications having multiple channels that demand power from a common source and for which benefit is derived from controlling the combined power demand of the multiple channels.

The block diagrams in the following description are mainly of dual channel systems where two substantially identical channels A and B are shown in each figure. In both channels, the same number designation is used to reference identical functional blocks. For example, in FIG. 1 the energy converter for channel A is substantially the same as the energy converter of channel B. Thus, the functional blocks for both converters in FIG. 1 are referenced by the same number [2]. In order to distinguish one converter from the other, however, the converter of channel A is labeled "2a" and the converter of channel B is labeled "2b." This same labeling convention is used throughout the drawings.

In view of the similarities between channels A and B and in the interest of simplicity, the following discussion uses a reference numeral in brackets without a letter "a" or "b" when the description applies to both channels. For example, the reference numeral [2] will be used when generically referring to energy converters 2a and 2b in FIG. 1 rather than reciting individual reference numerals. When specific differences are important to the description, the individual reference numerals with the letter will be used to refer to a specific block, and to distinguish it from related structures.

Returning to the description of FIG. 1, the functional blocks of a typical exciter circuit include: an energy converter [2] which receives input energy from an external source 1, typically a battery or generator producing regulated power. The converter [2] transforms this energy into a voltage and current appropriate for storing the energy in an energy storage device [3], which may typically be comprised of capacitor(s) in a typical ignition circuit. The energy storage device [3] is also connected to a discharge switch [4] for delivering the stored energy via an output network [5] and via an external connection [6], such as an ignition lead, to a sparking device [7]. The sparking device [7] delivers the energy from the storage device [3] in the form of a spark across an electrical gap at the tip of the sparking device to ignite a combustible mixture. The time during which the energy converter [2] is operating is typically referred to as the charge time, or charge cycle. In typical ignition circuits, the discharge switch [4] activates to transfer the stored energy into sparking device [7] immediately upon completion of the charge cycle. In the embodiment of FIG. 1 an energy sensor [8] continually monitors the charging of energy storage device [3] and generates a signal which has two substantially simultaneous effects. First, the signal terminates the charge cycle by signalling the converter [2] via a stop input [9]. Second, the signal initiates the discharge of energy stored in the energy storage device [3] by signalling a trigger circuit [10], which in turn triggers the discharge switch [4]. As known to those skilled in the art, other circuits may trigger the discharge event, provided they also terminate the charge cycle of the converter [2]. Collectively, the elements described above with reference to FIG. 1 are typical of ignition exciters known in the art, an example of which is described and illustrated in detail in the '073 patent.

The charge cycle is initiated in FIG. 1 by a start signal [12] which is generated periodically by a spark clock [11]. Clock pulses signal the converter [2] via its start input [12] to begin converting energy for storage in the energy storage device [3]. In previous circuits which are known in the art, the spark clock [11] begins generating clock pulses upon closure of the switch 68 and application of power to the channels A and B. In those circuits, the spark clocks [11], and the converters [2] of both channels A and B receive input power at substantially the same time. As will be further understood by considering the timing diagrams of FIG. 2, the first clock pulses 12a and 12b initiate the respective charge cycles of converters 2a and 2b at the same time causing their power draws from the power source 1 to occur simultaneously and their charge cycles to substantially overlap.

Figure 2:
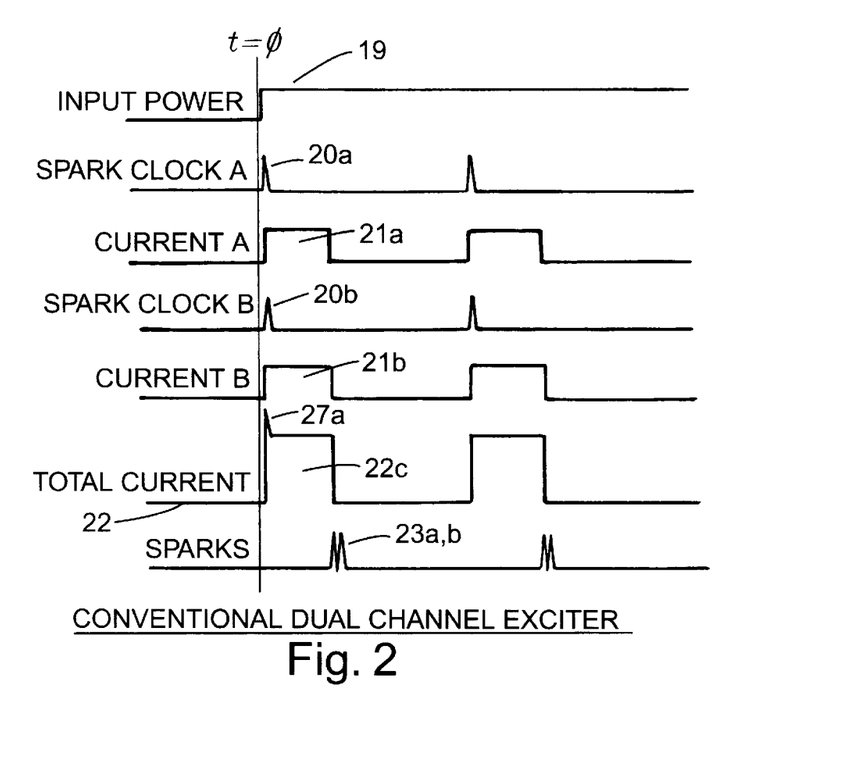
FIGS. 2 and 3 are timing diagrams comparing the cyclical spark timings and current demands at the input to channels A and B of a conventional dual channel ignition apparatus (FIG. 2) and of a ignition apparatus according to the invention as illustrated in FIG. 1, where the cyclical timing and current demands of one channel are offset with respect to the other channel (FIG. 3)

Referring first to FIG. 2, which illustrates current versus time for a conventional dual channel exciter, the spark clock pulses 20a and 20b occur simultaneously. The pulses 20a and 20b are triggered by the application of the power source 1 at time t equals zero, which corresponds to the time switch 68 is closed. These pulses initiate the respective charge cycles 21a (for converter 2a) and 21b (for converter 2b) represented as periods of positive current draw. The composite power demand, hence current draw, from power source 1 is shown as the summation of currents A and B and is labeled total current 22. Spark events 23a and 23b occur at the ends respectively of charge cycles 21a and 21b and are substantially at the same time although small imbalances in the charge times of converters 2a and 2b (FIG. 1) could account for imperfect overlap of these sparks.

In keeping with the invention, one of the channels A and B includes a delay circuit [13], which offsets the cyclical timing of one of the channels with respect to the other. Alternatively, as shown in the embodiment of the invention illustrated in FIG. 1, each of the channels includes a delay circuit[13] that delays the initiation or launching of the spark clock [11]. The setting of the time delays for the two delay circuits 13b and 13a are unequal. One of the delay times may be set to zero in which case the delay circuit may simply be removed form one of the two channels A or B.

The delay circuits [13] are responsive to power-up reset (PUR) circuits [15], which detect when the switch 68 closes and input power from the power source 1 is applied to the inputs of the channels A and B. During their respective delay times, the delay circuits [13] cause the spark clocks [11] to remain inactive by signals applied to their reset inputs [14]. The delay circuits [13] are only active once after application of power and never occur again until input power is removed and reapplied at a later time. Those skilled in the art will appreciate that the functions of the PUR circuit [15] and the delay circuit [13] may be combined into a single element, wherein the reset pulse from the PUR [15] is extended by an amount equal to the desired delay.

Figure 3:
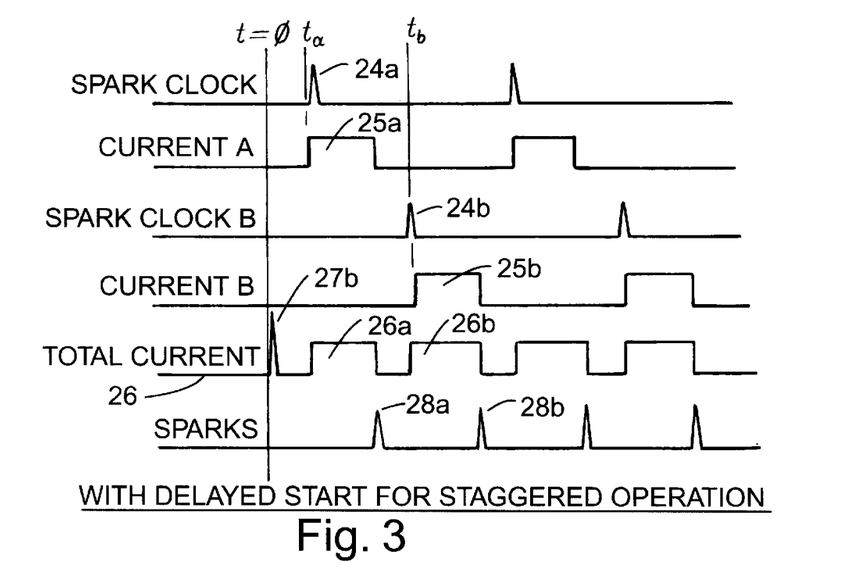

Referring to the timing and current draw diagrams of FIG. 3, the closure of switch 68 and application of power to the channels from power source 1 again occurs at t equal zero, but neither spark clock 24a nor 24b occur at that time. Instead, according to the invention, the occurrence of clock pulse 24a is delayed (by delay circuit 13a in FIG. 1) until t equals ta. Similarly, clock pulse 24b is delayed (by delay circuit 13b in FIG. 1) until t equals tb. It is important that ta is unequal to tb. The initiation of charge cycles 25a and 25b is thus delayed until the occurrences of clock pulses 24a and 24b, respectively. The total current 26 is no longer a summation of currents A and B since these currents no longer overlap; rather, the total current 26 includes individual non-overlapping pulses 26a and 26b reflecting the contributions of the non-overlapping pulses 25a and 25b. An apparatus thus constructed according to the invention will have half the magnitude of peak current in its total current when compared to the total current 22 of a conventional ignition system as illustrated by the diagrams of FIG. 2. Furthermore, since two smaller pulses 26a and 26b occur in the same time span as the single larger pulse 22c in the conventional ignition apparatus as illustrated in FIG. 2, the ripple frequency of the improved apparatus is double that of the conventional circuit. Thus the average current draw is both smoother and lower in amplitude.

Two other benefits of the invention are also illustrated by FIG. 3. At the time t equals zero, neither one of the converters [2] draws current. This is beneficial because a current surge is common in many electronic circuits when power is first applied. For example, the power source 1 provides transient energy to the filters [16] and optionally to other loads 69 in addition to the ignition apparatus of FIG. 1. As shown in the diagrams of FIGS. 2 and 3, a transient current spike [27] of high magnitude at time t equals zero results from adding these transient loads. This characteristic is called inrush current and is associated with the initial power surge into the filter circuits [16] of the channels A and B, which are part of the input power circuitry of the ignition apparatus. In a conventional dual channel ignition apparatus, this inrush current spike 27a is superimposed at the leading edge of total current draw pulse 22c such that the combined magnitude of the operating current plus the inrush current can exceed the capabilities of the input wiring or circuit protective devices such as fuses, circuit breakers or current limiters.

By making the delay time non-zero for both channels A and B non-zero in keeping with the invention, the inrush current spike 27b occurs when virtually zero operating power is required, so it is not superimposed on any other current demand, but constitutes a separate and less detrimental event. The total power includes both logic power which energizes the circuitry of channels A and B, and operating power which is delivered to the loads intermittently under control of the logic. Operating power is defined as power drawn from the power source 1 from which is derived the power applied to the load. Operating power also does not include the power associated with the initial inrush of current into the ignition apparatus when the switch 68 is closed. Those skilled in the art will appreciate that even if only one of channels has a delay, such as if ta equals zero, the inrush spike 27b would only add to the low magnitude pulse 26a as contrasted with its addition to the high (approximately double) magnitude pulse 22c of a conventional exciter without the invention.

The second additional benefit illustrated by the timing diagram of FIG. 2 is improved ignition efficient resulting from the non-overlapping or staggered nature of the spark events 28a and 28b. In a typical combustor application, intermittent repetitive sparks are used to ignite the fuel mixture. In the ideal case, one spark will light the mixture if conditions are right. These conditions include airflow, mixture ratio, temperature, pressure, atomization quality, and other variables. During the starting event, these conditions are continuously changing. Sparks, however, are short transient events which are discontinuous and are present for only a minute percentage of the time. A spark at an inappropriate instant can not light the mixture at all. To solve this problem a sequence of sparks is utilized, typically occuring at a fixed rate, and providing multiple chances to ignite the combustion. Increasing the number of spark events increases the probability that an event will occur synchronously with the exact conditions for ignition. Now, referring back to FIG. 2, observe that each pair of sparks [23] of a conventional ignition occur at the same time. If mixture conditions are not correct at that time, two chances have been wasted. The improvement offered by the invention staggers the sparks in an alternating sequence of A-B-A-B etc., providing twice as many discrete spark events [28] during which the conditions might be optimal for successful ignition. In some applications this may have an effect similar to doubling the spark rate, but without the size, weight and cost penalties.

Figure 4:
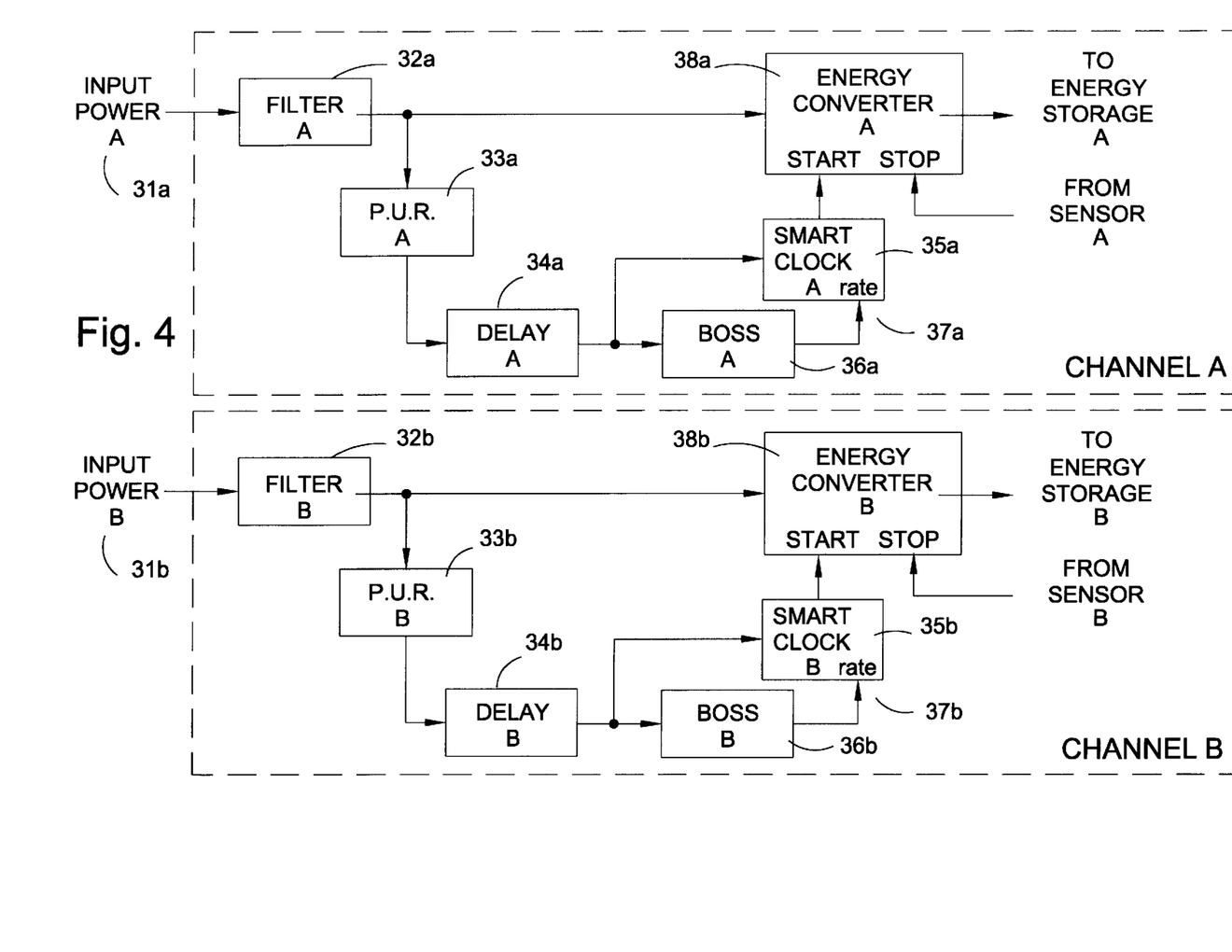
FIG. 4 is a block diagram of an of an alternative embodiment of the invention including a burst-of-sparks feature, and a separate power input for each channel, and in which only one of the channels is delayed.

FIG. 4 illustrates an alternative embodiment of the invention, utilized in a more complex ignition system which includes additional features. Although the overall system is more complicated, the specific circuitry which incorporates the instant invention is actually simpler than that shown in FIG. 1. Referring to FIG. 4, in order to simplify the block diagram only the front end of the system which includes the invention has been shown. The omitted function blocks, from the converter to the sparking device have been completely and adequately described with reference to FIG. 1. The power input is shown as two separate inputs 31a and 31b. In certain applications, for purposes of intentional redundancy associated with increased reliability, separate wiring and connectors are employed to deliver input power to each of the channels A and B. In fact, the two channels may reside in physically separate enclosures with non-adjacent mountings without departing from the spirit and scope of the invention.

In keeping with the invention, the power source for the two channels A and B is common to both even if the interconnecting wiring is separate. The application of power to the multiple channels must occur substantially simultaneously, as would be accomplished if the switch 68 were a multi-pole switch or relay, for the benefits of the invention to be realized.

Input power to each of the channels A and B is filtered by power conditioning filters [32] before being applied to the circuitry of the respective channels. A very small current, for example milliamperes, flows to power the low-power logic circuits, and an inrush current spike may flow for milliseconds to precharge the filter components. Power-up-reset (PUR) circuits [33] respond to the rise of input voltage when power is applied. These circuits generate a short pulse which is routed to various parts of the circuitry to ensure that all blocks power-up in a known state, and all become active at the same time immediately after the reset pulse terminates. For clarity, all of these connections have been omitted except for the ones important to the invention; those connections are from reset circuit 33a to delay circuit 34a and from reset circuit 33b to spark clock 35b and its associated burst-of-sparks (BOS) control circuit 36b.

Since a delay circuit is absent in channel B in FIG. 4, the reset pulse initializes the spark clock 35b and the BOS circuit 36b immediately following power-up. The spark clock 35b instantly generates a first clock pulse and then continues generating clock pulses at a repetitive rate which is influenced by the BOS control circuit 36b connected to its rate input.

The BOS circuit [36] in this embodiment has a binary output (2 states) representing commands for fast and slow. Similarly, the spark clocks [35] have a "rate" input [37] that commands them to generate repetitive clock pulses at one of two periodic rates. Following reception of the reset pulse, the BOS circuits [36] set and maintain their outputs in the "fast" state causing the spark clocks to generate clock pulses at the higher of two rates which is called the burst rate. After a preset time, or after counting a specified number of spark clock pulses, the BOS circuits [36] will automatically switch its output to the "slow" state. The detailed structure and operation of such a BOS circuit [36] is described in detail in U.S. Pat. No. 5,399,942, which is hereby incorporated by reference.

Converter 38b receives the clock pulses from clock circuit 35b. At the time of power-up, t equals zero, the first pulse causes initiation of the first charge cycle, which culminates with the generation of a spark. The method of charging and discharging to produce a spark is the same as was fully described with reference to FIG. 1. Ignition channel A in FIG. 4 includes delay circuit 34a which is triggered by reset circuit 33a upon power-up. However, resetting of BOS circuit 36a and spark clock 35a are delayed by the delay circuit 34a, which delays the reset pulse until t equals ta. Operation of the spark clock 35a responsive to BOS circuit 36a and of converter 38a are the same as described above for channel B. Thus, the sequence of charge/spark cycles begins at t equals ta for channel A whereas it began at t equals zero for channel B. Because the operation of channel A is launched before that of channel B, the cyclical power draws of the two channels resulting from the charge/spark cycles are offset with respect to one another. Because the two channels operate independently, they may drift into synchronization during continuous operation. Although such synchronous operation results in increased peak power draw, it occurs substantially after startup when large power peaks from transients have subsided. Thus, the power peaks in the power drawn by the channels A and B need not be maintained in an offset relationship for the duration of the operation of the ignition apparatus. Preferably, the delay circuit 34a is preset so that during the burst period the sequences will be 180° out of phase.

Figure 5:
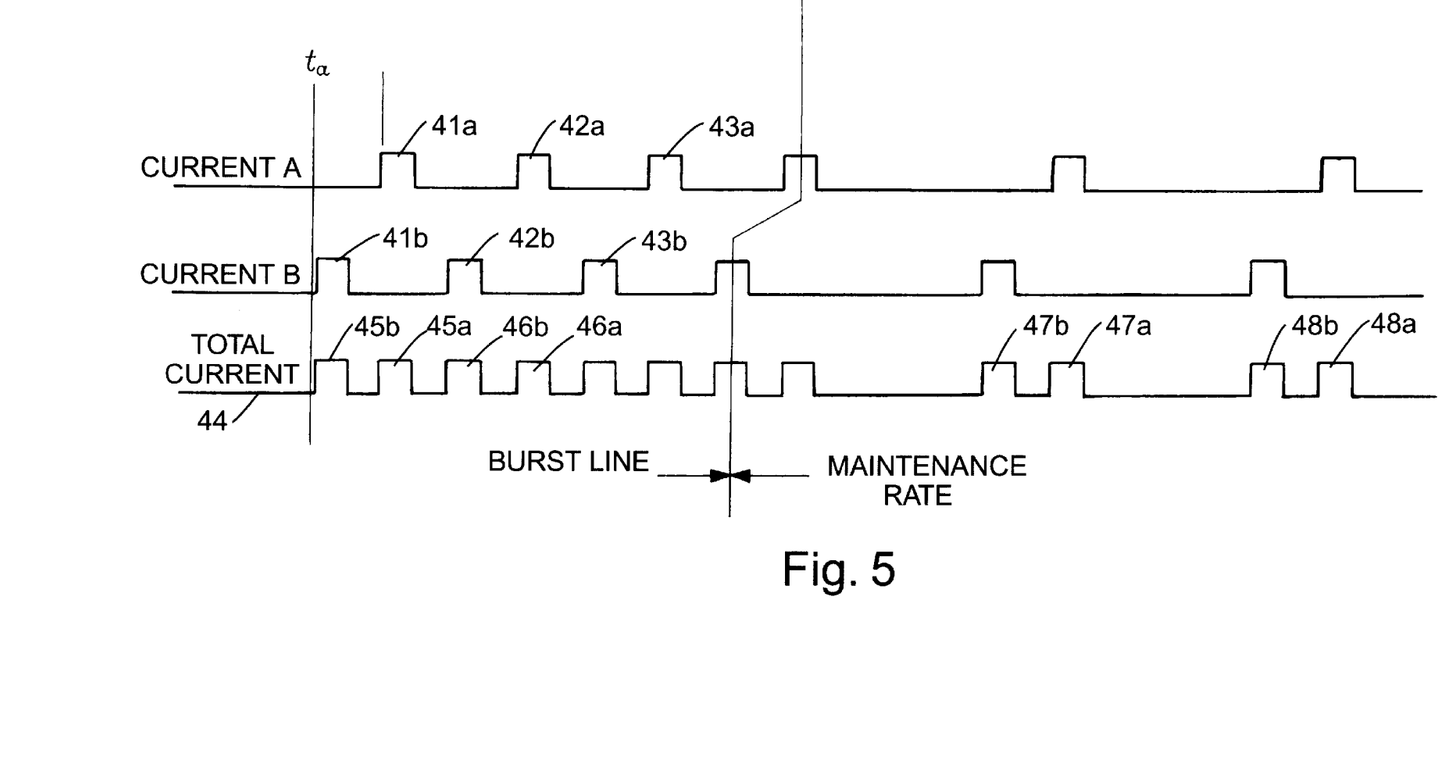
FIG. 5 is a timing diagram for the embodiment of FIG. 4 for the case where the delayed start is preset to offset the channels so that their sequences are 180 degrees out of phase during the burst period.

FIG. 5 is a timing diagram corresponding to the operation of the apparatus of FIG. 4. Channel B produces charging cycles represented by the pulses of current demand 41b, 42b, and successive pulses with the first pulse 41b occurring at t equals zero. Channel A produces charging cycles represented by the pulses of current demand 41a, 42a, and succeeding pulses but with its first pulse 41a delayed until t equals ta. The total current 44 consists of pulses 45b, 45a, 46b, 46a, and successive pulses which correspond to the individual demands of pulses 41b, 41a, 42b, 42a, respectively. The BOS period corresponds to the higher rate during the first four pulses of either channel A or B, after which the rates decrease to a much lower maintenance rate. Because the timing is established by the initial delay of the sequence of channel A, the pulses during the maintenance rate occur in pairs [47] and [48]. It will be appreciated by those skilled in the art that the current pulses could be maintained in an equally alternating rhythm and 180° phase shift during the entire duration of the operation of the ignition apparatus—i.e., both during the burst and maintenance periods; also, the burst mode could include a time period in which the spark rate gradually decreases from a high to a low rate, without departing from the spirit or scope of the invention.

It should also be apparent to those skilled in the art that for apparatus consisting of more than two channels, the phase shift could be set to equally space the current pulses of the multiple channels. For example, in a three channel system the phase shift would be 120° between channels.

Figure 6:
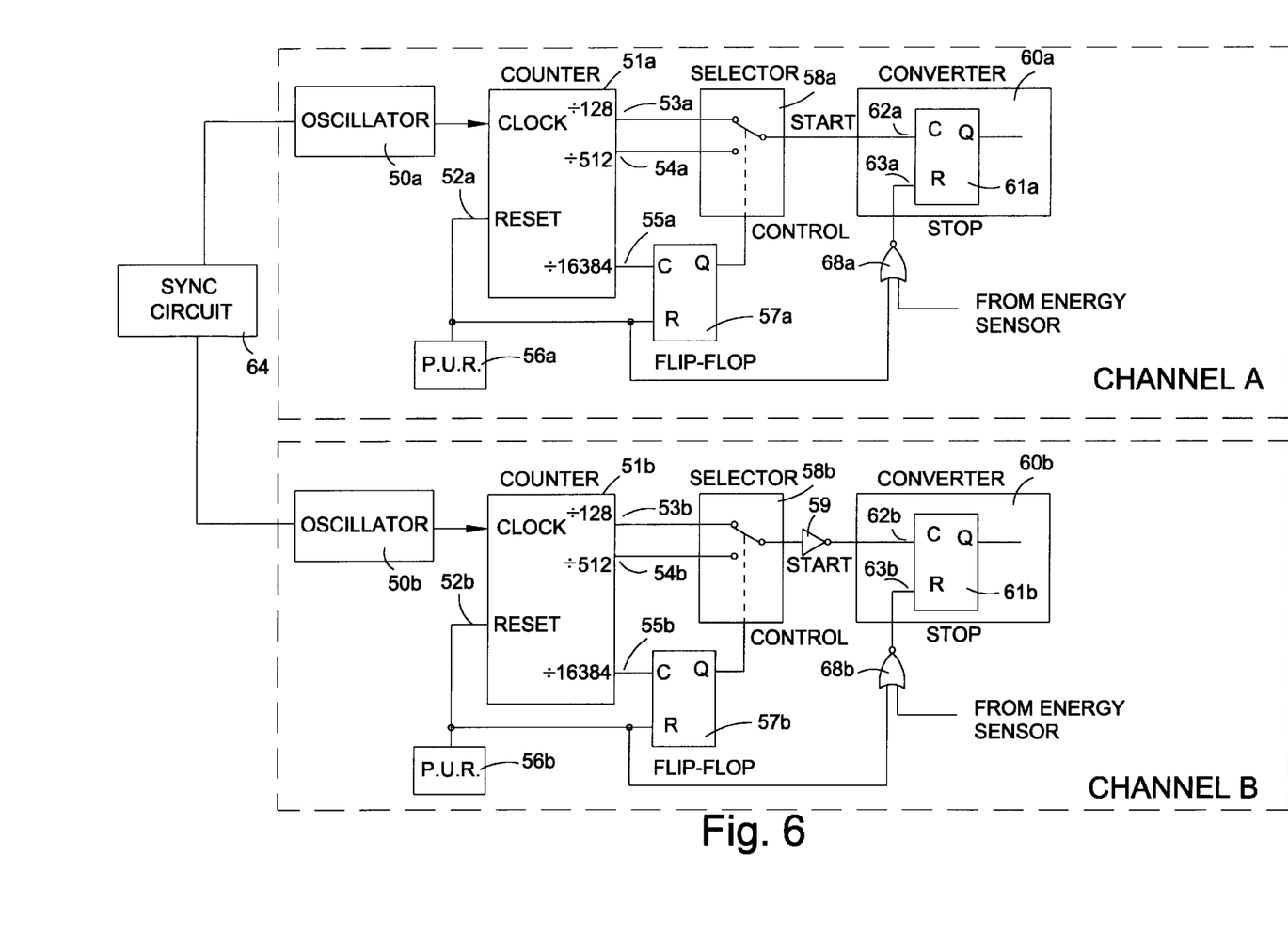
FIG. 6 is a block diagram of an alternative embodiment of the invention using digital counters and logic to accomplish delayed start, burst-of-sparks, and staggered sparking, and which also includes a failsafe channel synchronization circuit.

FIG. 6 is a circuit diagram of an alternative embodiment of the invention which is implemented with digital counters and logic for precise control of sequences and timing. As before, the two channels A and B are independent and one will operate without the other operating, such as in the case of a failure in one of the channels. Referring to the figure, the timing sequences are generated by a digital counter [51] which is driven by an accurate oscillator [50] that may be built-in to the counter integrated circuit. Outputs [53], [54], and [55] of the counter [51] provide sub-multiples of the oscillator frequency, with division ratios chosen so that the frequency of the output [53] is at the burst frequency, the output [54] is at a lower frequency corresponding to the maintenance frequency, and finally the output [55] is at a much lower frequency. During just the first half-cycle of output [55] many cycles of burst output [53] will occur. A "reset" input [52] to the counter [51] guarantees that it will start counting beginning at an internal count of binary zero immediately after the power-up reset pulse from PUR circuit [56]. An example follows, using particular frequencies chosen from those available with a binary counter, but it will be appreciated by those skilled in the art that the choice of particular values is intended to be only illustrative of the operation of an embodiment and other values could be chosen without departing from the spirit and scope of the invention. It should also be understood that other counter configurations can perform an equivalent function, such as separating the counter responsible for ultra-low frequency BOS output [55] from that counter responsible for outputs [53] and [54].

Values chosen for the oscillator components set its frequency to 512 Hz. Output [53] is taken after the seventh binary stage yielding a divide-by-128 sub-multiple of the oscillator frequency, or four (4) Hz. Similarly, output [54] will be taken after the ninth stage and have a frequency of one (1) Hz. Output [55] will be taken after the fourteenth stage and so will have a very low frequency of just $\frac{1}{32}$ Hz.

The ultra-low frequency output [55] will be used only once to control the duration of the burst-of-sparks. It is not used as a frequency; rather, its period of 32 seconds (which is the inverse of its frequency) will be used as a measure of time interval. More specifically, the very first time that output [55] will transition from its binary 0 value to its binary 1 value will be one-half of the period, or 16 seconds after starting from a count of zero. Although this zero-to-one transition will repeat at 32 second intervals, only the first transition is used in this embodiment. That transition clocks a binary flip-flop [57] to change its output from zero to one. Further transitions are insignificant since they can only force an output state of one which has already been set by the first clock transition. The only way for flip-flop [57] to return to its zero state is via its "reset" input which receives a pulse from PUR circuit [56] only after power has been interrupted and reapplied at a later time.

The output of flip-flop [57] is connected to the control input of a signal selector network [58] which is preferably a group of digital logic gates capable of delivering one of at least two input signals to its output. Many such configurations are available, so the selector [58] is illustrated as a single-pole-double-throw switch controlled by a signal at its "control" input which originated at flip-flop [57]. Counter outputs [53] and [54] are fed to the two inputs which will be switched by the selector [58]. During the burst period, while flip-flop [57] sends a zero to the control input of selector

[58], the switch will deliver the burst frequency of four (4) Hz from [53] to the output of selector [58]. Following termination of the burst period at t equals 16 seconds, the flip-flop [57] will transition to logic one, signalling the control input of selector [58] to connect to its output the maintenance frequency (1 Hz) at output [54].

The output of selector [58] is suitable as a complex clock signal which can be used in a manner similar to the output clock pulses from spark clock circuit [11] in FIG. 1 to start a charge cycle. In order to delay the launching into operation of one of the two canals A and B in FIG. 6 in accordance with the invention, an inverter gate 59 is inserted into channel B, (but not channel A) to invert the logic output of selector 58b before it is delivered to the "start" input of the converter circuit 60b for channel B. The outputs from the selectors [58] are not narrow clock pulses; instead they are square waves with 50% duty cycle. That means the zero-to-one transitions will occur at the frequency of the output, and equally spaced between any two zero-to-one transitions is a one-to-zero transition. The one-to-zero transitions are 180° out-of-phase with the zero-to-one transitions. In keeping with the instant invention, inverter gate 59 modifies the output of selector 58b so that its one-to-zero transitions become zero-to-one transitions and vice versa.

The "start" and "stop" inputs to an energy converter circuit [60] are preferably implemented with an edge-triggered flip-flop [61]. The edge-triggered "clock" input [62] is not responsive to the logic levels of zero or one but to the transition in level; furthermore, it is only responsive to zero-to-one transitions, but ignores one-to-zero transitions, making it useful as the "start" input of the converter circuit [60]. Now, with converter 60a started by the zero-to-one transitions of selector 58a and the opposite converter 60b started by the inverted output (due to inverter 59) of the other selector 58b, the two channels will be locked in synchronization but 180° out-of-phase.

The ultimate effect of the digital logic of the embodiment in FIG. 6 is to produce a delayed sequence on both channels, and with the equivalent differential delay having the value which offsets the two charge/spark sequences by 180°. The fact that both channels are delayed is inherent in the binary counting sequence of the counter [51]. Starting from a count of zero, the counting begins immediately after PUR circuit [56] resets the circuitry. The earliest transition that will occur is on burst output 53a, and that very first zero-to-one transition occurs one-half of a burst-frequency period later. For the burst frequency of four (4) Hz, the period is 250 milliseconds, and one-half cycle is 125 milliseconds. Consequently, channel A is delayed 125 msec. Channel B is responsive to the very first one-to-zero transition of output 53b (since it will be inverted by inverter 59) which occurs one full period after reset. Consequently, channel B is delayed 250 msec. An important improvement over the embodiments of FIGS. 1 and 3 is that after the frequency reduction occurs at the end of the burst period, the charge/spark cycles remain exactly 180° out-of-phase. Referring for a moment to FIG. 5, the pairs of pulses [47] and [48] will not occur with the embodiment of FIG. 6 but would be replaced with an equally spaced and alternating sequence of pulses—i.e., 47b, 47a, 48b, 48a, etc.

For reliability, ignition systems are preferably constructed with at least two redundant channels so that if one channel fails the other can still ignite the combustion. It is therefore important that the two channels do not share common elements which could disable both channels if they failed. Because of this separation, systems such as those described herein have several duplicated elements. When full redundancy is not required, the objects of the instant invention are adequately accomplished by a circuit which eliminates the duplicate functions such as with a single timing circuit feeding both channels. Considering the circuit of FIG. 6, functions of the duplicate set of oscillators [50], counters [51], and selectors [58] could be accomplished by only one set (e.g., 50a, 51a, and 58a) since the signal generated by the opposite set (50b, 51b, 58b) is substantially identical. Inverter [59], receiving the output of 58a instead of 58b, produces the same sequence with the same delayed start and phase shift as the fully redundant circuit of FIG. 6 but with fewer components.

Returning to the fully redundant embodiment in FIG. 6, the substantially identical channels are never matched exactly; minute timing differences in the oscillator frequencies of the two channels invariably cause frequency drift. In many systems this drift is enough that over several minutes of operation the initial 180° phase shift between the channels disappears and the channels drift into and out of phase. This phenomenon is acceptable in many systems and does not compromise the utility of the invention. Often, the ignition accomplishes its mission of igniting the combustion and is turned off long before serious drift can occur. However, an improvement in the invention consists of adding failsafe channel sync circuit 64 between the channels as illustrated in the embodiment of FIG. 6.

The sync circuit 64 allows at least one of the two channels to observe a timing marker of the other channel and synchronize its own timing to that marker. This allows maintaining a preset phase synchronization in perpetuity by reestablishing synchronization at least once per cycle to zero the effects of any drift during the previous cycle. In order to preserve redundancy, this circuit must be failsafe since it interconnects the channels. If either channel stops working, it cannot compromise the continued operation of the other channel via this link.

Figure 7:
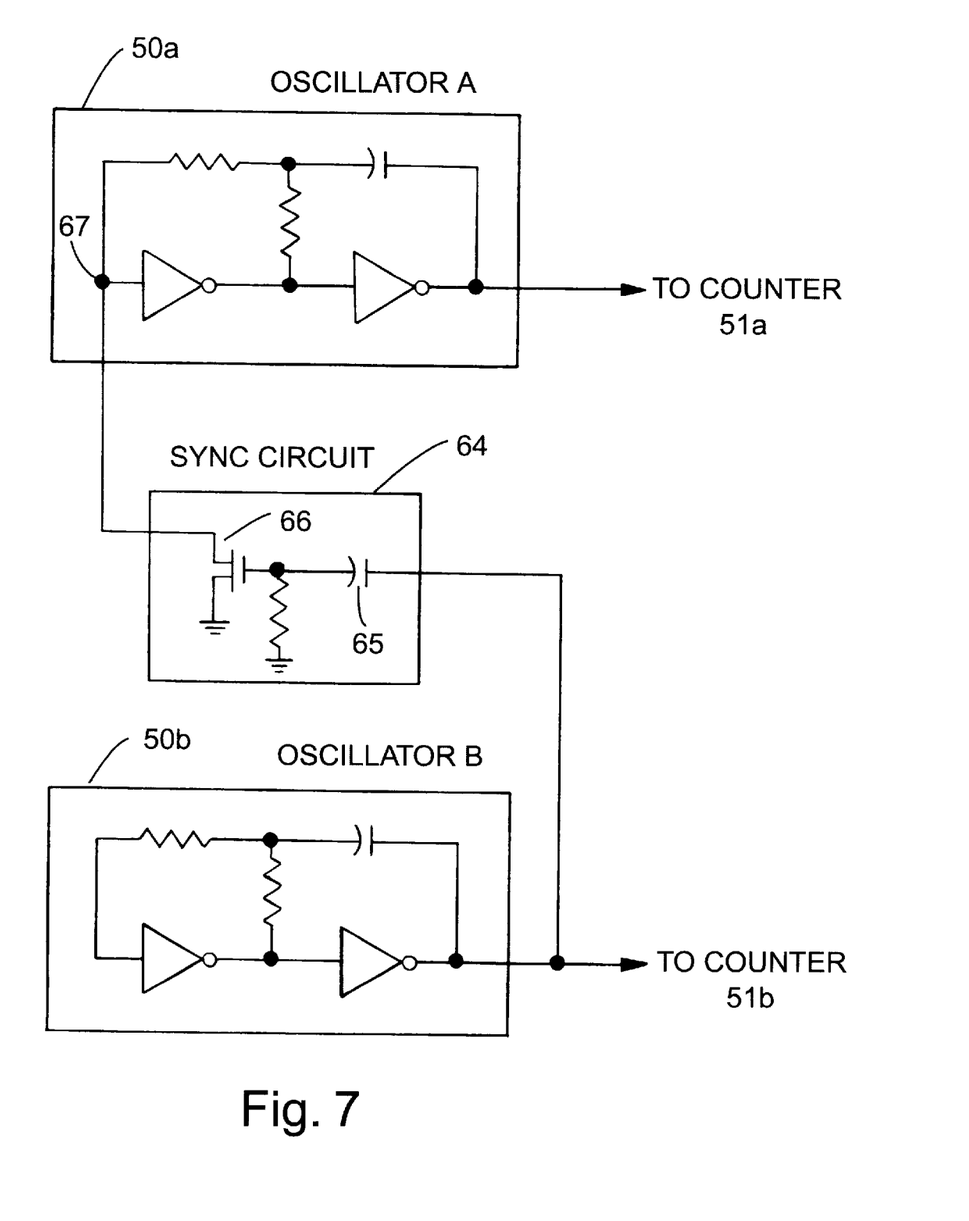
FIG. 7 is a partial circuit diagram showing one possible implementation of a synchronization circuit for two oscillators as used in FIG. 6 to implement failsafe channel synchronization.

FIG. 7 shows a circuit diagram of one possible embodiment of sync circuit 64. The synchronization is guaranteed by forcing oscillator 50a to lock its frequency to that of oscillator 50b. Synchronizing the counters in a counter-based circuit guarantees that the binary value of the counters [51] will remain substantially identical. Although designed to work with a simple resistor-capacitor-inverter oscillator as shown in detail in FIG. 7, those skilled in the art will appreciate that other types of oscillators, such as those controlled by crystals, could be synchronized without departing from the spirit and scope of the invention.

Each time oscillator 50b transitions from a zero to a one, capacitor 65 will couple that transition into the gate of transistor 66. Transistor 66, turning on for just a few microseconds, pulls the node 67 of oscillator 50a to ground (logic zero). This action forces each cycle of oscillators 50a and 50b to coincide, and thus the binary count value of counters [50] will remain equal.

While no interconnection is perfectly failsafe, the sync circuit 64 is reasonably and acceptably failsafe. If oscillator 50b stops due to a failure of any component associated with channel B, the sync pulses coupled through capacitor 65 will cease, and transistor 66 will remain off effectively disconnecting (through high impedance) from node 67. Oscillator 50a is released from any influence of channel B and oscillates as if there were no connection. Similarly, if oscillator 50a stops due to a failure of any component associated with channel A, oscillator 50b continues to oscillate normally.

Returning to FIG. 6, the flip-flop [61] at the input to converter [60] is a "toggle" flip-flop. Each zero-to-one transition at the "start" input appears at its clock input [62] and causes the flip-flop output to change state or "toggle" to its opposite state. The first transition will always cause the output of flip-flop [60] to transition from zero to one because it was reset to zero by the PUR circuit [56] via OR gate [68]. This enables the converter [60] to begin pumping energy from the power input to the energy storage device. The converter [60] continues to pump energy until the energy sensor [8] detects accumulation in the storage device [3] equal to a preset level. A complete explanation of this cycle is found herein in reference to the description of FIG. 1 and so will not be repeated. The output of the sensor [8] terminates the charge cycle by resetting flip-flop [61] with a pulse sent via OR gate [68] to the reset input [63]. Unlike the clock input [62], the reset input [63] does not toggle the output of the flip-flop [61]; rather, it always resets it to the logic zero state. Under normal circumstances, the alternating clock pulses at the input [62] and reset inputs [63] of the flip-flop [61] will start and stop the charge cycle. Occasionally, however, when certain environmental extremes or low input voltages add stress to the system, a charge cycle may not quite complete its full energy storage before the next start pulse. In such a situation, the components of the channel are drawing operating power virtually continuously. Without resting the components between charge/spark cycles (i.e., charge/discharge cycles), they may begin to experience a buildup of heat that will eventually either cause a catastrophic failure of the circuitry or a gradual deterioration of performance. An aspect of the invention includes built-in protection for this condition. Because it operates in a "toggle" mode, flip-flop [61] will stop rather than start the converter if a second clock [62] occurs without an intervening reset [63]. This gives the converter a one-cycle rest, and although it operates every other cycle, and reduces the spark rate to half, it protects the system from catastrophic failure, thus adding to its overall reliability.

Although the invention has been described in connection with certain embodiments, it will be understood that there is no intent to in any way limit the invention to those embodiments. On the contrary, the intent is to cover all alternatives, modifications and equivalents included within the spirit and scope of the invention as defined by the appended claims.

We claim:

1. A method for reducing peaks of operating power drawn from a power source by a system of multiple redundant channels where each channel of the system independently demands operating power from the power source in an intermittent manner and transfers energy into a load through a switching element, where no channel shares its switching element with another channel, the method comprising the steps of:

simultaneously applying power to the channels from the power source;

drawing operating power from the power source in an intermittent manner into each of two or more channels of the system; and offsetting the launching of the drawing of the operating power into each of the two or more channels so that occurrences of peak operating power draw in a first channel at least initially do not fully overlap the occurrences of peak operating power draw in a second channel.

2. The method of claim 1 wherein the system is an ignition system in which the intermittent drawing of operating power by one of the channels is cyclic, where successive drawing of operating power by the channel is separated by a waiting period for the purpose of controlling a spark rate.

3. The method of claim 1 wherein the offsetting of peak operating power in each of the first and second channels occurs independently with respect to the other channel.

4. The method of claim 1 wherein the step of offseting the launching of the drawing of operating power by the two or more channels includes the step of delaying initial drawing of operating power to the second channel with respect to an initial drawing of operating power by the first channel.

5. The method of claim 1 wherein the system is an ignition system, and wherein the load is one or more plugs for generating an ignition spark.

6. The method of claim 1 wherein the storing of the operating power as potential energy by each of the channels includes the step of charging a storage device in each channel.

7. The method of claim 6 wherein the drawing of operating power by the two or more channels is launched so that the charging of the storage device begins earlier in the first channel than in the second channel.

8. The method of claim 7 wherein the charging cycle of the storage device in the first channel is completed before beginning the charging cycle of the storage device in the second channel.

9. The method of claim 1 wherein the step of drawing operating power into each of the two or more channels is delayed in response to an application of power from the power source for a time period sufficient to ensure that an occurrence of a peak demand of operating power from any of the channels does not fully overlap a power surge in a power line when the power source is connected to the system.

10. The method of claim 7 wherein successive chargings of the storage device in one of the first and second channels are equally spaced in time with respect to an intervening charging of the storage device in the other channel.

11. The method of claim 1 wherein successive drawings of operating power by the first channel are equally spaced in time with respect to intervening drawings of operating power by the second channel.

12. A system for controlling the consumption of energy by multiple channels all drawing energy from the same source, where each channel delivers its energy to a load in an intermittent manner, the system comprising:

two or more channels each directly drawing energy from a source for delivering the energy to a load in a cyclical manner and under the control of a switching element such that cyclical peaks of operating power occur as the energy is drawn from the source, where no channel shares its switching element with another channel;

a delay circuit in at least one of the channels to offset the cyclical peaks of operating power with respect to the cyclical peaks of operating power of at least one other channel by delaying the drawing of energy into at least one of the two or more channels after the source is connected to the channels such that the cyclical peaks of operating power for the said at least one channel are out of phase with respect to the cyclical peaks of operating power of said at least one other channel.

13. The system of claim 12 wherein the delay circuit is a circuit that delays only an initial drawing of operating power into the said at least one of the channels.

14. The system of claim 12 wherein the two or more of the channels each include a delay circuit, where the delays for each of the two or more channels is different from the other ones of the delays.

15. The system of claim 12 including a synchronization device for maintaining the out-of-phase relationship between the cyclical peaks of operating power for the first and second channels.

16. The system of claim 12 wherein each of the two or more channels is an exciter of an ignition system and the load is an igniter plug for igniting fuel in a turbine engine.

17. The method of claim 1 including the step of synchronizing the occurrences of peak operating power in the first and second channels at all times in which power is applied to the system so that occurrences of peak operating power in the first channel do not fully overlap occurrences of peak operating power in the second channel.

18. The system of claim 14 wherein each of the channels in the system has a delay circuit.

19. The system of claim 17 wherein the delay of one or more of the delay circuits is substantially zero.

20. The method of claim 4 wherein the launching of power into two or more channels is independently delayed such that a failure of the delay in one channel does not effect the delay in another channel.

21. The method of claim 1 including the steps of: in at least one of the channels cyclically charging a energy storage device from the power source and discharging the energy storage device into the load; substantially continuously charging the energy storage device to a predetermined level before discharging the energy into the load; and truncating the charging of the energy storage device before the energy storage device is charged to the predetermined level if the time of substantially continuous charging exceeds a predetermined maximum time.

22. The method of claim 21 including the step of delaying between an end of one charging cycle and the beginning of a next.

23. The method of claim 21 includes the step of sensing the state of charge of the energy storage device and ending the charging of the energy storage device when the predetermined level is sensed.

24. The method of claim 21 wherein the step of discharging energy into the load includes the step of discharging the energy into an igniter plug.

25. The method of claim 1 including the steps of: in at least one of the channels cyclically charging and discharging an energy storage device for delivering energy to the load in an intermittent manner; providing under normal conditions a delay between an end of the charging in one cycle and a beginning of charging in a next; and preventing the delay from vanishing when, under abnormal conditions, time periods of the charging cycles extend and the end of charging in one of the cycles approaches the beginning of charging in the next.

26. The method of claim 24 including the step of sensing the state of charge of the energy storage device and ending the charging of the energy storage device when a predetermined level of charge is sensed.

27. The method of claim 25 wherein the step of preventing the delay from vanishing includes the step of truncating the charging of the energy storage device before the energy storage device is charged to the predetermined level if the time of charging exceeds a predetermined maximum time.

28. The method of claim 24 wherein the step of discharging energy into the load includes the step of discharging the energy into an igniter plug.

* * * * *